(12) United States Patent
Yamada et al.

(10) Patent No.: US 12,447,989 B2
(45) Date of Patent: Oct. 21, 2025

(54) DETERMINATION DEVICE

(71) Applicant: TOYOTA JIDOSHA KABUSHIKI KAISHA, Toyota (JP)

(72) Inventors: Kenichi Yamada, Nisshin (JP); Toshiki Kashiwakura, Tokyo (JP); Akane Umezu, Nagoya (JP); Kayo Tsumoto, Nisshin (JP); Yuta Shishime, Tokyo (JP); Satoshi Komamine, Nagoya (JP); Kenji Ishiyama, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 17 days.

(21) Appl. No.: 18/475,658

(22) Filed: Sep. 27, 2023

(65) Prior Publication Data
US 2024/0199052 A1 Jun. 20, 2024

(30) Foreign Application Priority Data
Dec. 14, 2022 (JP) .................................. 2022-199778

(51) Int. Cl.
*B60W 50/14* (2020.01)
*G06Q 50/40* (2024.01)
(52) U.S. Cl.
CPC ............. *B60W 50/14* (2013.01); *G06Q 50/40* (2024.01); *B60W 2050/146* (2013.01); *B60W 2554/80* (2020.02)

(58) Field of Classification Search
CPC ........... B60W 50/14; B60W 2050/146; B60W 2554/80; G06Q 50/40; Y02T 10/70; Y02T 10/7072
See application file for complete search history.

(56) References Cited

U.S. PATENT DOCUMENTS

2023/0256838 A1* 8/2023 Horvath .................. B60L 53/36
320/109

FOREIGN PATENT DOCUMENTS

| | | |
|---|---|---|
| JP | 2021-023044 A | 2/2021 |
| JP | 2021-121885 A | 8/2021 |

OTHER PUBLICATIONS

English translation of JP2021-023044 (Year: 2021).*

* cited by examiner

*Primary Examiner* — Brian A Zimmerman
*Assistant Examiner* — Cal J Eustaquio
(74) *Attorney, Agent, or Firm* — SoraIP, Inc.

(57) ABSTRACT

The determination device includes an acquisition unit and a control unit. The acquisition unit acquires sensor information output by a sensor that detects an obstacle around the vehicle to be charged. The control unit identifies an obstacle located around the vehicle based on the sensor information, and determines whether or not the vehicle can be charged by the power supply vehicle.

4 Claims, 6 Drawing Sheets

DETERMINATION DEVICE

CROSS-REFERENCE TO RELATED APPLICATION

This application claims priority to Japanese Patent Application No. 2022-199778 filed on Dec. 14, 2022, incorporated herein by reference in its entirety.

BACKGROUND

1. Technical Field

The present disclosure relates to a determination device that determines whether a vehicle can be charged by a power supply vehicle.

2. Description of Related Art

A system has been proposed in which a charging service provided by a business operator is reserved when a battery charge amount becomes equal to or less than a predetermined value in a vehicle traveling using electricity as a power source (for example, refer to Japanese Unexamined Patent Application Publication No. 2021-121885 (JP 2021-121885 A)). With the service in the related art, the power supply vehicle of the business operator goes to a location of a vehicle requiring charging. A worker of the power supply vehicle inserts a charging plug into a charging port of the vehicle to be charged to charge a battery. With such a technique in the related art, it is possible to cause a third party to charge the battery of the vehicle even while a user is away from the vehicle.

SUMMARY

However, when the user is away from the vehicle, even when the worker of the business operator providing the charging service tries to charge the vehicle to be charged, the charging may not be possible depending on a surrounding environment of a place where the vehicle is parked. For example, when there is an obstacle such as a wall or a fence in front of the charging port of the vehicle to be charged, it may be difficult for the worker to connect the connector of the charging cable of the power supply vehicle to the charging port, depending on the distance between the charging port and the obstacle. Further, when the charging port of the vehicle to be charged is away from a position at which the power supply vehicle is able to be parked, and the power supply vehicle is not equipped with a charging cable having an appropriate length, it is also difficult to perform charging.

In view of such circumstances, an object of the present disclosure is to reduce occurrence of loss caused by a power supply vehicle dispatched to a vehicle of a user being unable to charge the vehicle of the user.

A determination device according to an embodiment of the present disclosure that solves the above issue includes: an acquisition unit that acquires sensor information output by a sensor that detects an obstacle around a vehicle to be charged; and a control unit that specifies the obstacle that is located around the vehicle, based on the sensor information, and determines whether charging of the vehicle by a power supply vehicle is possible.

According to the present disclosure, it is possible to reduce the occurrence of loss caused by the power supply vehicle dispatched for charging the vehicle of the user being unable to charge the vehicle of the user.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described below with reference to the drawings. Note that the drawings used in the following description are schematic. Dimensions, ratios, and the like in the drawings do not necessarily coincide with actual ones.

Overall Configuration of System

Figure 1:
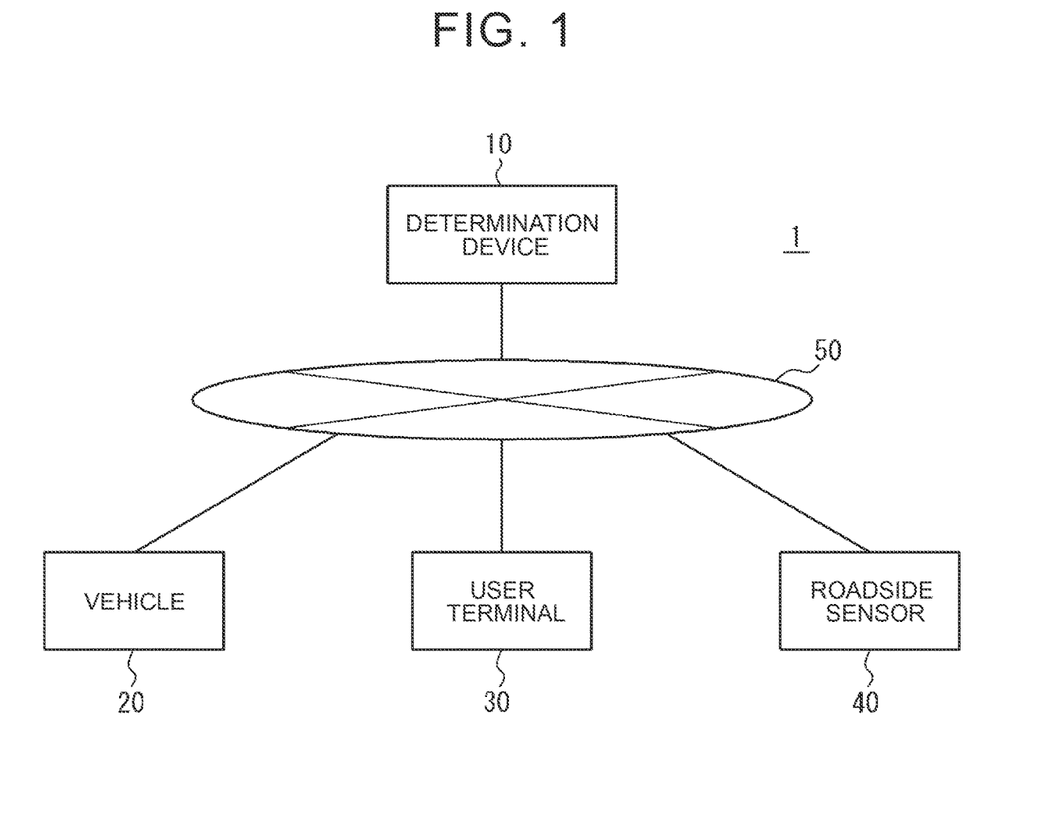
FIG. 1 is a block diagram illustrating a schematic configuration of a system including a determination device according to an embodiment of the present disclosure.

FIG. 1 is a configuration diagram of a system 1 that dispatches a power supply vehicle 63 (see FIG. 4) that provides a charging service to a vehicle 20 of a user in response to a request from the user. The system 1 includes a determination device 10, a vehicle 20, a user terminal 30, and a roadside sensor 40, and a network 50 that connects these components to each other in a communicable manner. There are one or more vehicles 20, user terminals 30, and roadside sensors 40. The roadside sensor 40 is not an essential component.

The determination device 10 is a computer operated by a provider that provides a charging service. The determination device 10 can receive a charging request from the in-vehicle information terminal mounted on the vehicle 20 of the user or the user terminal 30 possessed by the user. The charging request includes a request for immediate charging and a request for reserving charging by specifying a time. Upon receiving a charging request from the user, the determination device 10 acquires sensor information that detects the surroundings of the vehicle 20 output from the sensor of the vehicle to be charged, and recognizes an obstacle located in the surroundings of the vehicle 20. When the obstacle is recognized, the determination device 10 determines whether or not the power supply vehicle 63 can charge the vehicle 20. The processing performed by the determination device 10 may be executed in a distributed manner on a plurality of computers.

The vehicle 20 is externally chargeable electrified vehicle including battery electric vehicle (BEV) and plug-in hybrid electric vehicle (PHEV).

The user terminal 30 is an information processing device such as a Personal Computer (PC) carried by a user, a smart phone, and a portable information terminal. The user terminal 30 includes a display for displaying information, an input unit for inputting information, a processor for executing various arithmetic processing, a built-in camera, and a memory for storing information and a program. The user terminal 30 may be equipped with an application provided by an operator for receiving a charging service. When the charging service is provided as the membership service, the user uses the user terminal 30 to register information of the vehicle 20 with the determination device 10 in advance. The information of the vehicle 20 to be registered includes information such as a registration number of the vehicle 20, a vehicle type, and a color, information for communicating with the vehicle 20, and the like. Further, the information on the vehicle 20 to be registered may include information on the position of the charging port of the vehicle 20, the type and the position of the sensor included in the vehicle 20. The user can request the determination device 10 to charge the vehicle 20 using the user terminal 30. The request for charging the determination device 10 may include identification information of the user registered in the determination device 10, a date and time and a place where charging is desired, identification information of the vehicle 20 registered in the determination device 10, and the like.

The roadside sensor 40 is disposed on the road 60 and/or the parking lot 61 (see FIG. 4), and is a sensor capable of detecting the position of the vehicle 20. The roadside sensor 40 may be a camera that captures an image of the road 60 and/or the parking lot 61. The determination device 10 acquires sensor information detected by the roadside sensor 40. When the roadside sensor 40 is a camera, the sensor information is image information captured by the camera. The determination device 10 can request the roadside sensor 40 located in the vicinity of the vehicle 20 to be charged to transmit the acquired sensor information.

The network 50 includes a wide area network such as the Internet. The determination device 10, the vehicle 20, the user terminal 30, and the roadside sensor 40 are connected to a wide area network via an access line. Access lines may include, but are not limited to, a fourth generation mobile communication system (4G), such as a third generation mobile communication system (3G), Long Term Evolution (LTE), a fifth generation mobile communication system (5G), Wi-Fi, and Worldwide Interoperability for Microwave Access (WiMAX).

Configuration of Determination Device

Figure 2:
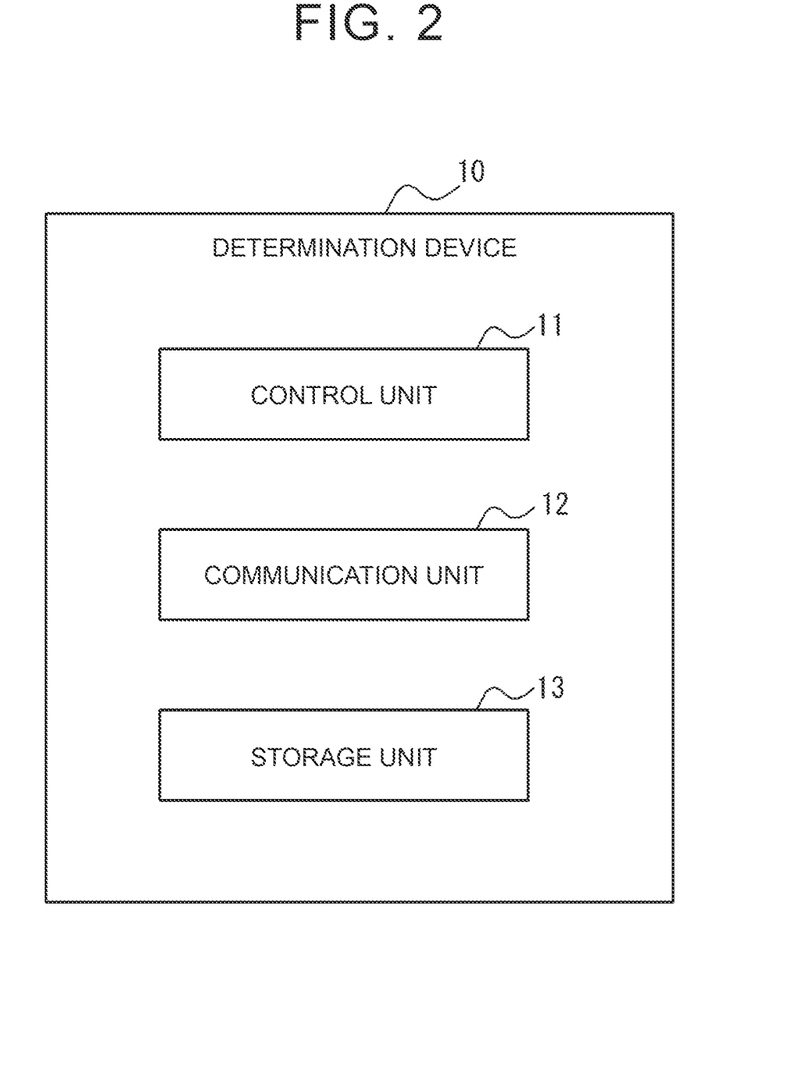
FIG. 2 is a block diagram illustrating a schematic configuration of the determination device of FIG. 1.

As illustrated in FIG. 2, the determination device 10 includes a control unit 11, a communication unit 12, and a storage unit 13.

The control unit 11 includes at least one processor, at least one dedicated circuit, or a combination thereof. A processor may be a general-purpose processor, such as a central processing unit (CPU), or a special-purpose processor specialized for a particular process. The control unit 11 executes processing related to the operation of the determination device 10 while controlling each unit of the determination device 10. Hereinafter, the processing executed by the control unit 11 may be described as being executed by the determination device 10. The control unit 11 executes processing of the determination device 10 described in the flow diagrams of FIG. 5 and FIG. 6, which will be described later, according to the program.

The communication unit 12 includes at least one external communication interface connected to the network 50. The external communication interface may be either a wired communication or a wireless communication interface. The communication unit 12 receives information for performing processing by the determination device 10 from the outside (for example, the vehicle 20, the user terminal 30, and the roadside sensor 40), and transmits information obtained as a result of the processing by the determination device 10 to the outside (for example, the vehicle 20 and the user terminal 30). The communication unit 12 is an acquisition unit.

The storage unit 13 includes at least one semiconductor memory, at least one magnetic memory, at least one optical memory, or a combination of at least two types thereof. The storage unit 13 functions as, for example, a main storage device, an auxiliary storage device, or a cache memory. The storage unit 13 stores programs and data used for the operation of the determination device 10 and data obtained by the operation of the determination device 10. The information stored in the storage unit 13 may be updatable by, for example, information acquired from the network 50 via the communication unit 12.

The storage unit 13 may store information of the registered user who receives the charging service and the vehicle 20 held by the user. The information may include information such as identification information of the user, a storage location (parking lot) of the vehicle 20, identification information of the vehicle 20, a position of a charging port of the vehicle 20, a type and a position of a sensor included in the vehicle 20, and the like.

Note that the determination device 10 of the present embodiment may further include an input unit and an output unit. That is, in addition to receiving (inputting) and transmitting (outputting) information via the communication unit 12, the determination device 10 may input and output information via the input unit and the output unit. The input unit includes, for example, a keyboard, a mouse, and a microphone for voice input. The output unit includes, for example, a display and a speaker.

Configuration of Vehicle

Figure 3:
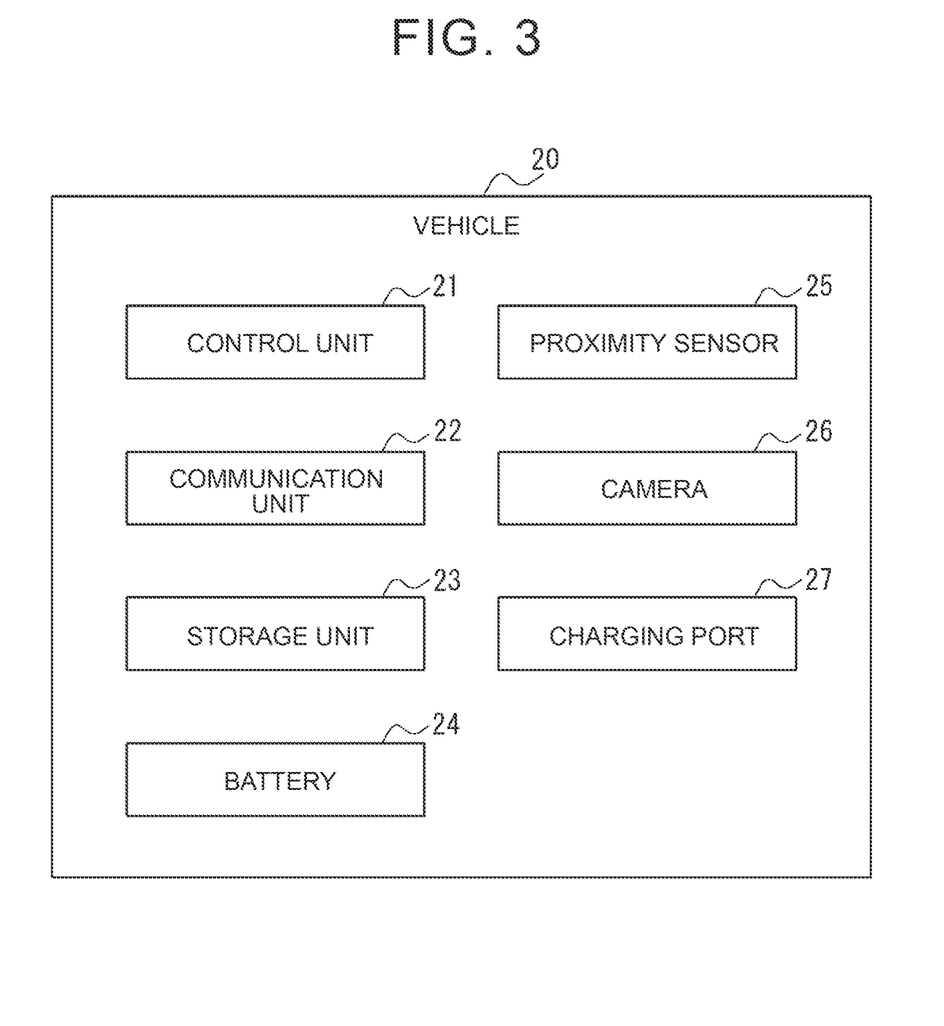
FIG. 3 is a block diagram showing a schematic configuration of the vehicle of FIG. 1.

As illustrated in FIG. 3, the vehicle 20 includes a control unit 21, a communication unit 22, a storage unit 23, a battery 24, a proximity sensor 25, a camera 26, and a charging port 27. Vehicle 20 includes, in addition to these, the drive mechanism, a braking mechanism, a control mechanism, a sensor, and safety equipment or the like that are usually included in the vehicle 20. The vehicle 20 may further include an in-vehicle information terminal that can be used to request the determination device 10 to charge. In the following description, it is assumed that the user communicates with the determination device 10 using the user terminal 30 instead of the in-vehicle information terminal provided in the vehicle 20.

The control unit 21 includes at least one processor, at least one dedicated circuit, or a combination thereof, similarly to the control unit 11 of the determination device 10. The control unit 21 executes various processes of the vehicle 20 described below because the vehicle 20 receives charging using the charging service. The control unit 21 may operate the proximity sensor 25 and the camera 26 in response to an instruction from the determination device 10 via the communication unit 22.

The communication unit 22 includes at least one external communication interface connected to the network 50. The external communication interface is, for example, an interface compatible with a mobile communication standard such as LTE, 4G or 5G. The communication unit 22 receives data used for the operation of the vehicle 20, and transmits data obtained by the operation of the vehicle 20 to the outside (for example, the determination device 10). In particular, the communication unit 22 can transmit the sensor information output by the proximity sensor 25 and the camera 26 to the determination device 10.

The storage unit 23 includes one or more memories, similar to the storage unit 13 of the determination device 10. The storage unit 23 stores arbitrary information used for the operation of the vehicle 20.

The battery 24 includes, for example, a repeatedly chargeable and dischargeable battery such as a lithium-ion secondary battery or a nickel-hydrogen secondary battery. In place of the secondary battery, the vehicle 20 may employ another power storage device such as a multilayer capacitor. The battery 24 includes a control circuit that controls current, voltage, temperature, and the like. The battery 24 acquires the remaining battery capacity of the secondary battery and notifies the control unit 21 of the remaining battery capacity. The battery 24 may be located anywhere within the vehicle 20, such as under a rear seat of the vehicle 20 or in a luggage compartment.

The proximity sensor 25 is disposed in the vicinity of the charging port 27 of the vehicle 20, and can detect an obstacle located opposite to the charging port 27. The obstacle located opposite to the charging port 27 includes an obstacle located in front of the charging port 27 and an obstacle that becomes an obstacle when a connector of a cable for charging is connected to the charging port 27. The proximity sensor 25 includes, for example, an ultrasonic sensor, a photoelectric sensor, a laser range finder, and the like. The proximity sensor 25 is preferably located within a 20 cm, more preferably within a 10 cm, from the charging port 27. The proximity sensor 25 can detect, for example, the presence of an obstacle in a distance range including from 20 cm to 100 cm and the distance to the obstacle.

Note that the proximity sensor 25 included in the vehicle 20 is not limited to one sensor provided in the vicinity of the charging port 27. For example, the proximity sensor 25 may be a sensor disposed at a plurality of locations of the vehicle 20. The plurality of locations is, for example, four corners of the vehicle 20. When two proximity sensors 25 adjacent to each other across the charging port 27 of the vehicle 20 detect the presence of an obstacle, it can be estimated that an obstacle exists in the vicinity of the charging port 27.

The camera 26 is an imaging device that captures an image of the periphery of the vehicle 20. The camera 26 includes an optical system and an image sensor. The image sensor includes a Charge-Coupled Device Image Sensor and a Complementary MOS Image Sensor. The camera 26 may include, for example, a plurality of imaging devices that image the front, left and right sides, and the rear of the vehicle 20. Preferably, obstacles in all directions around the vehicle 20 can be imaged by a plurality of cameras 26.

Figure 4:
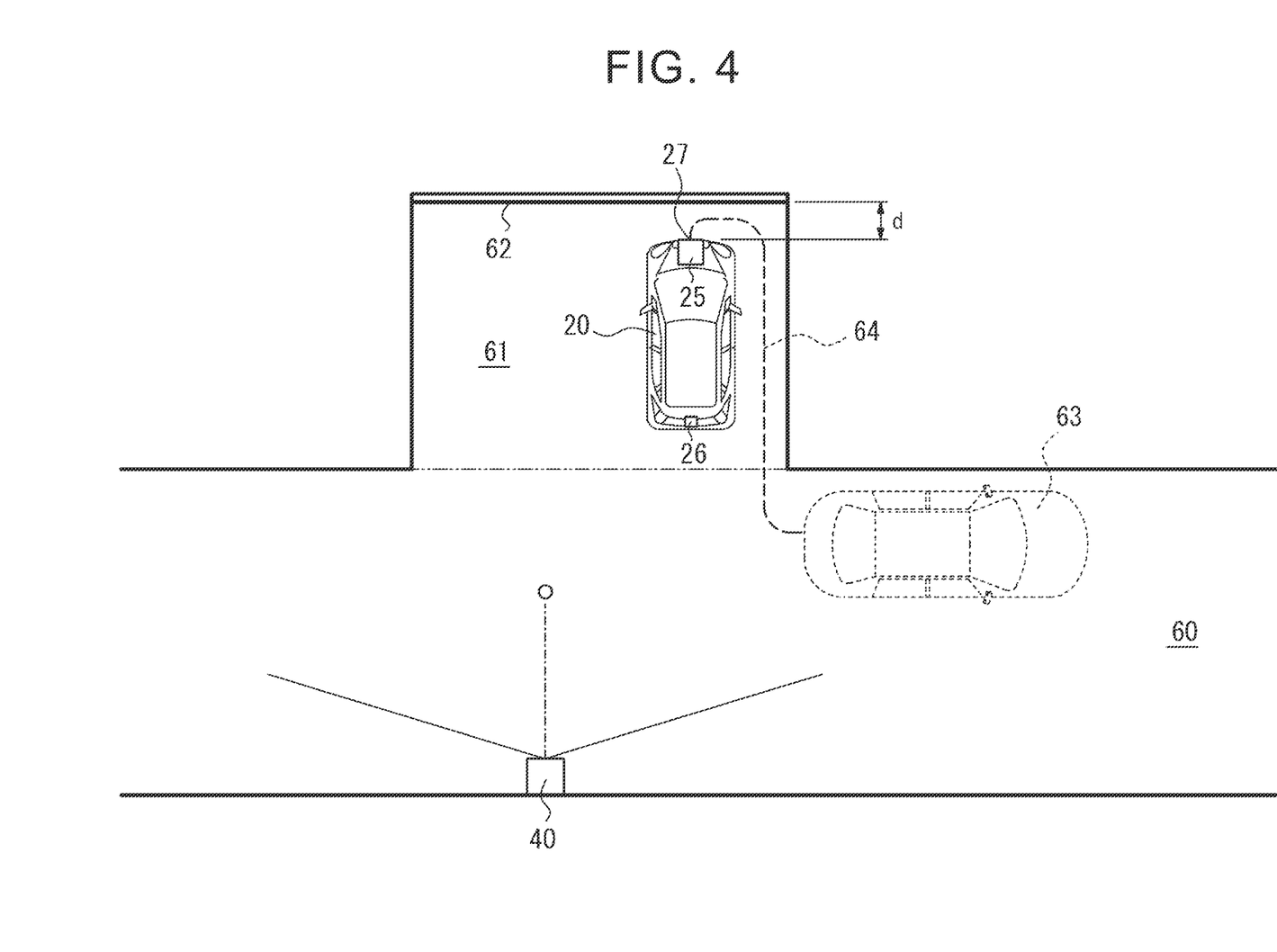
FIG. 4 illustrates an example of a surrounding environment of a user vehicle parking in a parking lot.

The charging port 27 is a connection portion for externally charging the battery 24. The charging port 27 includes a charging inlet for connecting a connector of a charging cable from an external charging device. The charging port 27 may be disposed at any position, such as an upper portion of a front grille of the vehicle 20, a front fender, a rear fender, and a rear bumper. In FIG. 4, the charging port 27 is disposed on the upper portion of the front grille.

An Example of a Charging Environment of a Vehicle

FIG. 4 illustrates an example of an assumed surrounding environment of the vehicle 20 to be charged. The vehicle 20 is parked in a parking lot 61 facing the road 60. The vehicle 20 is parked forward toward a wall 62 located on the outer periphery of the parking lot 61. The charging port 27 of the vehicle 20 is located at an upper portion (front nose portion) of the front grille. Further, in FIG. 4, virtual positions of the power supply vehicle 63 for charging the vehicle 20 and the charging cable 64 for connecting the power supply vehicle 63 and the charging port 27 are indicated by broken lines.

In the case of FIG. 4, the vehicle 20 can measure the distance d between the charging port 27 and the wall 62 which is an obstacle by the proximity sensor 25 provided in the vicinity of the charging port 27. For example, if the distance d between the charging port 27 and the wall 62 is less than 20 cm, it is difficult to connect the connector of the charging cable 64 to the charging port 27. In addition, when the distance d is 20 cm to 100 cm, it is difficult for an operator who provides a charge service to perform an operation, and there may be restrictions on routing of cables. If the distance d is 100 cm from 20 cm, the length of the required cable is generally increased. When the distance d is equal to or larger than 100 cm, it is expected that the work performed by the worker is not problematic.

Further, the vehicle 20 is equipped with a plurality of cameras 26 (only a rear camera is displayed in FIG. 4) and acquires an image of the surroundings of the vehicle. In addition, a roadside sensor 40 such as a surveillance camera may be disposed on the road 60 or the parking lot 61. The roadside sensor 40 may be attached to a structure such as a utility pole on a road. The roadside sensor 40 may be, for example, a camera with a wide-angle lens that is set at a relatively high position of 2 meters or more from the ground and looks down on the ground. The determination device 10 can acquire sensor information about the surroundings of the vehicle 20 from the cameras 26 and the roadside sensors 40, and recognize the surrounding environment of the vehicle 20.

The control unit 11 of the determination device 10 can collect information of the proximity sensor 25, the camera 26 of the vehicle 20, and the roadside sensor 40 to determine whether or not the vehicle 20 can be charged. The control unit 11 of the determination device 10 may notify the user terminal 30 carried by the user of the possibility of charging the vehicle 20. In addition, when it is determined that the vehicle 20 can be charged, the control unit 11 determines a place where the power supply vehicle 63 can be parked and a length of the charging cable 64 that is required. The parking location of the power supply vehicle 63 is determined in consideration of compliance with traffic regulations and not interfering with other vehicles and traffic. The length of the charging cable is determined in consideration of the distance from the charging port 27 of the vehicle 20 to the parking location of the power supply vehicle 63. The control unit 11 of the determination device 10 can determine a schedule for the power supply vehicle 63 to charge the plurality of vehicles 20 to be charged, and dispatch the power supply vehicle 63. A charging cable having a length corresponding to the vehicle 20 is mounted on the power supply vehicle 63.

Flow of a Process of Distributing a Supply Vehicle to a Vehicle

Next, a method of dispatching the power supply vehicle 63 to the vehicle 20 to be charged will be described with reference to FIG. 5. The processing executed in the flowchart of FIG. 5 below can be executed by the processor of the determination device 10, the vehicle 20, and the user terminal 30 in accordance with a program. Such a program can be stored in a non-transitory computer-readable medium. Non-transitory computer-readable media include, but are not limited to, hard disks, Random Access Memory (RAM), Read Only Memory (ROM), flash memories, Compact Disc Read only memory (CD-ROM), optical storage devices, magnetic storage devices, and the like. The same applies to the processing shown in FIG. 6 described later.

First, a user operates the user terminal 30 to activate a dedicated application to request charging from a provider providing a charging service (S101). The charging request includes an immediate charging request and a charging reservation request. The request for charging may include information on a place and a date and time at which charging is desired. The place where charging is desired may be a place where the vehicle 20 is currently parked.

Upon receiving the charge request, the determination device 10 instructs the vehicle 20 to detect information about the surrounding environment of the vehicle 20 (S102). At this time, the vehicle 20 waits for charging and performs parking in a parking lot of a user's home, a public parking lot, a parking lot of a large facility, or the like.

Upon receiving the instruction to detect the information of the surrounding environment, the vehicle 20 activates the proximity sensor 25 and/or the camera 26 to detect the information of the surrounding environment of the vehicle 20 (S103).

The vehicle 20 transmits the detected information of the surrounding environment to the determination device 10 as sensor information (S104). The vehicle 20 may add processing to the information of the surrounding environment acquired from the proximity sensor 25 and/or the camera 26 and transmit the information to the determination device 10.

The determination device 10 recognizes an obstacle based on the sensor data (S105). The recognition of the obstacle includes recognition of the presence or absence of an obstacle in the vicinity of the charging port 27 of the vehicle 20. If there is an obstacle, recognition of the obstacle includes recognition of the distance to the obstacle (S106).

Next, the determination device 10 requests the user terminal 30 and/or the roadside sensor 40 to transmit images around the vehicle 20 (S107).

Upon receiving the image transmission request from the determination device 10, the user terminal 30 displays a message prompting the user to capture an image of the vehicle surroundings, such as "Please capture an image of the vehicle and its surroundings". When viewing this indication, the user S108 images of the surroundings of the vehicle using a camera built in the user terminal 30.

The user uses the user terminal 30 to capture an image of the surroundings of the vehicle 20. The captured images are transmitted to the determination device 10 by the function of the application of the user terminal 30 (S109).

On the other hand, the roadside sensor 40, which is a camera that has received the image sending request, captures a surrounding image including the vehicle 20 (S110).

The roadside sensor 40 transmits the captured images to the determination device 10 (S111).

Note that S111 from S107 and subsequent S108 is not essential. The process of the system 1 may proceed directly from S107 to S112. Alternatively, only one of the set of S108 and S109 and the set of S110 and S111 may be performed. In addition, the determination device 10 may not execute S111 from S107 depending on S106. For example, when it is determined in S106 that the charging cable 64 cannot be connected to the charging port 27 of the vehicle 20 because the distance to the obstacle is short, S111 may not be executed from S107.

Next, in S112, the determination device 10 determines whether or not the vehicle 20 can be charged based on the sensor information acquired from the vehicle 20 and the surrounding images of the vehicle 20 acquired from the user terminal 30 and the roadside sensor 40. In accordance with the distance from the charging port 27 of the vehicle 20 to the surrounding obstacle, it is determined whether charging is possible. For example, if the distance from the charging port 27 to the obstacle is less than 20 cm value, it is determined that the charging cannot be performed. For example, when the distance from the charging port 27 to the obstacle is 100 cm from 20 cm, the determination device 10 determines whether or not the vehicle 20 can be charged by referring to images of the surroundings of the vehicle 20. The lengths of 20 cm, 100 cm, and the like are examples. Depending on the size of the connector of the charging cable 64, the allowable bending radius of the charging cable 64, and the like, values different from these lengths can be set.

When it is determined in S112 that the vehicle 20 cannot be charged (S112: No), the determination device 10 notifies the user terminal 30 of this fact (S113).

Upon receiving the notification, the user terminal 30 displays on S114 that the vehicle 20 cannot be charged. In this case, the user may enter the vehicle 20 and change the parking position of the vehicle 20. If the user changes the parking position of the vehicle 20, the system 1 may repeat the following process S102.

When it is determined in S112 that the vehicle 20 can be charged (S112: Yes), the determination device 10 determines the length of a cable required for parking the vehicle 20 (S115). The determination device 10 determines the parking position of the power supply vehicle 63 from the sensor information and the image around the vehicle 20, and determines the length of the cable connecting the charging port 27 and the charging battery mounted on the power supply vehicle 63. The determination device 10 may grasp the positional relationship between the vehicle 20 and the surrounding obstacle based on the image of the periphery of the vehicle 20, virtually dispose the charging cable 64 between the vehicle 20 and the power supply vehicle 63, and calculate the length thereof. The determination device 10 determines the virtual arrangement of the charging cable 64 in consideration of the free space around the vehicle 20 and the allowable bending radius of the charging cable 64.

When it is determined in S112 that the vehicle 20 can be charged, the determination device 10 may transmit a notification indicating that the vehicle can be charged to the user terminal 30 before or after S115.

The determination device 10 determines the schedule of one or more power supply vehicles 63 in consideration of the positions of the plurality of vehicles 20 to be charged, the scheduled charging time, and the required length of the cable. The determination device 10 distributes the power supply vehicles 63 in accordance with the determined schedule (S116). Accordingly, the determination device 10 can dispatch the power supply vehicle 63 after confirming in advance that the vehicle 20 is in a state of being able to be charged by the power supply vehicle 63. Therefore, the system 1 can reduce the occurrence of loss due to the fact that the dispatched power supply vehicle 63 cannot charge the vehicle 20 of the user.

In particular, since the determination device 10 can acquire the sensor information of the obstacle located opposite to the charging port 27 from the proximity sensor 25 provided in the vicinity of the charging port 27 of the vehicle 20, it is possible to accurately determine whether or not the vehicle 20 can be charged.

In addition, when an obstacle located in the vicinity of the vehicle 20 is identified, the determination device 10 can generate a notification of different contents based on a difference in distance from the charging port 27 to the obstacle. As a result, it is possible to transmit to the user a level-divided notification such as that charging cannot be performed, that charging is difficult, and so on, according to the distance to the obstacle.

Further, the determination device 10 can acquire information capable of determining the length of the charging cable 64 necessary for connecting from the power supply vehicle 63 to the charging port 27. Therefore, the determination device 10 can cause the power supply vehicle 63 equipped with the charging cable 64 having an appropriate length to charge the vehicle 20 of the user.

Processing when the Vehicle of the User Who has Reserved the Use of the Charging Service is Parked Next, when the vehicle 20 that reserves the use of the charging service is parked after traveling, it is desirable to secure an appropriate space in front of the charging port 27 in preparation for receiving the charging service. The flow of processing in such a case will be described with reference to the flowchart of FIG. 6.

Figure 6:
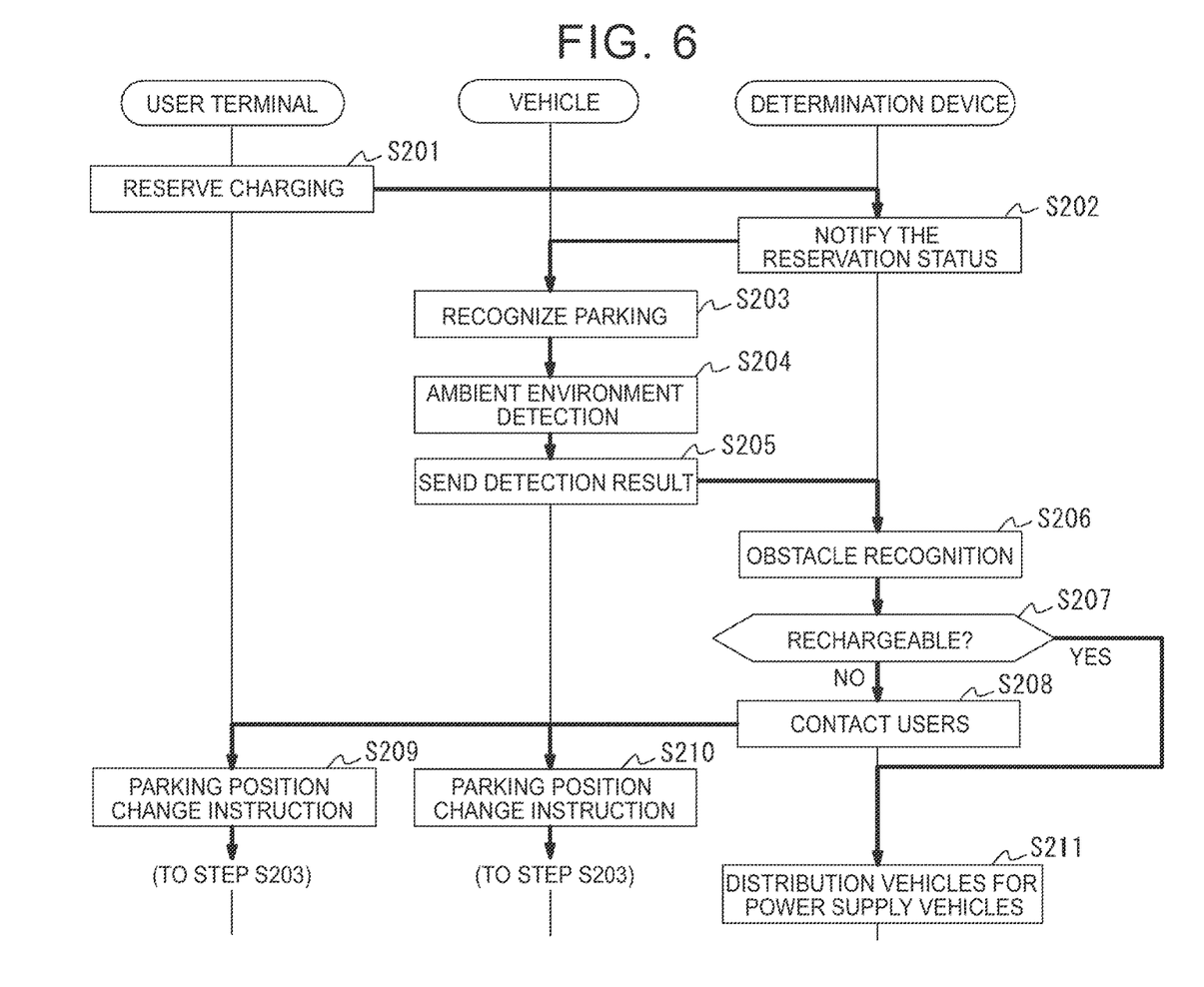
FIG. 6 is a flowchart illustrating an exemplary process of parking a vehicle of a user who has reserved use of charge service.

First, the user starts an application by the user terminal 30, and reserves a charge service to the vehicle 20 of the user with respect to the determination device 10 (S201). The user inputs information such as a place and a date and time for which charging is desired to the user terminal 30, and makes a reservation. The place of charging in this case may be a parking place registered in advance for the vehicle 20, for example, a parking lot of a home.

The determination device 10 that has received the reservation from the user terminal 30 notifies the vehicle 20 to be charged that the vehicle has been reserved for charging (S202). As a result, the vehicle 20 enters the reserved state of charging. The control unit 21 of the vehicle 20 recognizes that the vehicle 20 is in a charging reservation state, and executes information processing in accordance with the recognition.

The user may get on the vehicle 20 before the scheduled date and time of the reserved charging. After the user uses the vehicle 20, when the user returns to the reserved charging location and parks, the vehicle 20 transitioning from the running state to the parking state is detected (S203). In this case, it is assumed that the charging service is provided by the power supply vehicle 63 before the user moves the vehicle 20 next time.

Vehicle 20 operates the proximity sensor 25 and the camera 26 and detects the surrounding condition (S204) when it recognizes that the user has parked at the location where the charging has been reserved.

The vehicle 20 transmits the detected information of the surrounding environment to the determination device 10 as sensor information (S205).

Figure 5:
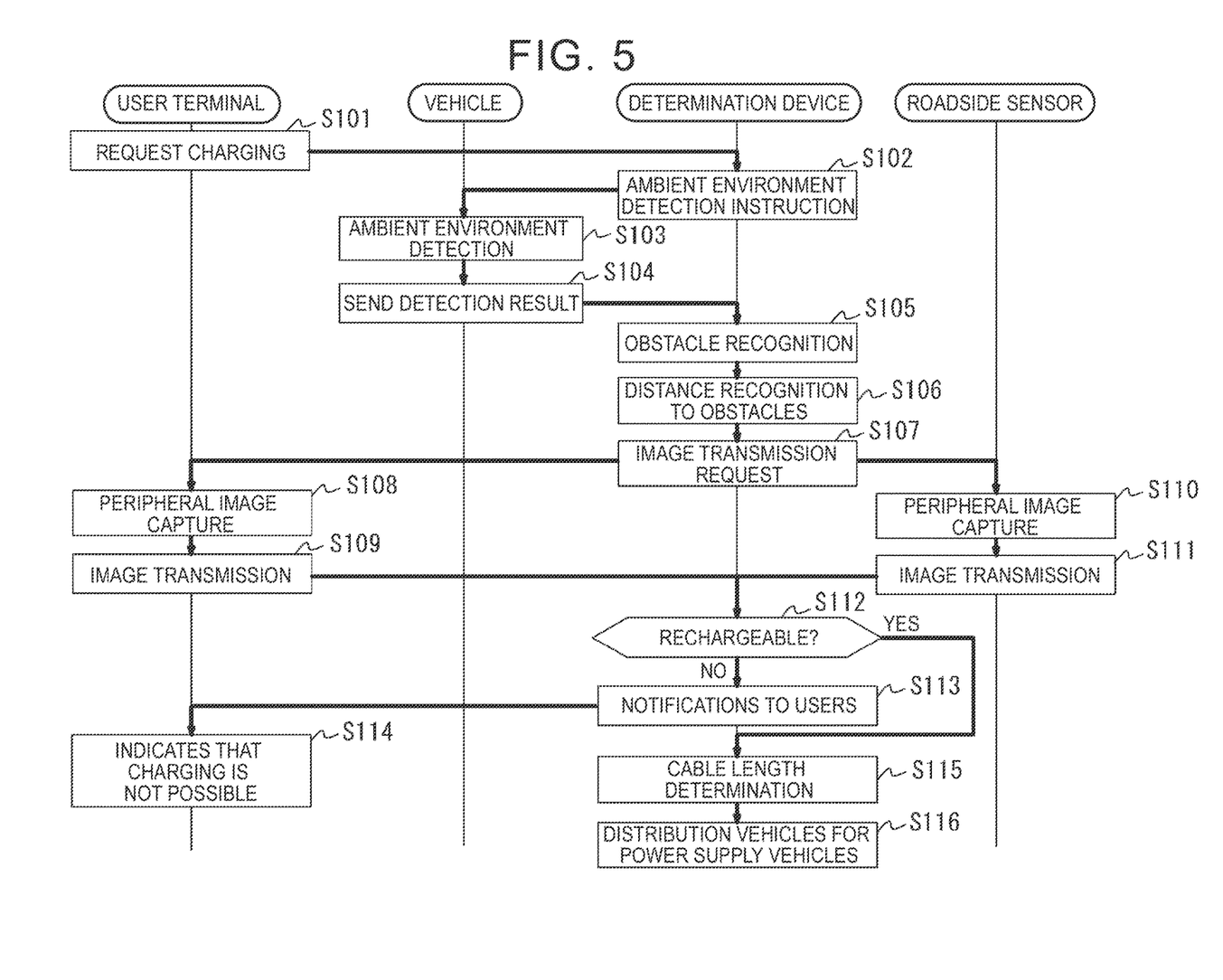
FIG. 5 is a flowchart illustrating an exemplary process of confirming a surrounding environment of a vehicle to be charged.

The determination device 10 acquires sensor data and recognizes an obstacle as in S105 of FIG. 5 (S206).

The determination device 10 determines whether or not the device can be charged based on the recognition of an obstacle in the surrounding environment (S207). For example, when an obstacle is detected in the vicinity of the predetermined distance of the charging port 27 based on the sensor information of the proximity sensor 25, the determination device 10 determines that charging cannot be performed.

When it is determined that the charging cannot be performed by S207 (S207: No), the determination device 10 notifies the user that the charging cannot be performed at the present position of the vehicle 20 (S208). The communication to the user is executed by transmitting a notification to the user terminal 30 associated with the vehicle 20 or the in-vehicle information terminal of the vehicle 20 registered in advance.

Upon receiving the notification from the determination device 10, the user terminal 30 displays a message instructing to change the parking position on S209.

Upon receiving the notification from the determination device 10, the in-vehicle information terminal displays a message instructing to change the parking position on the display of the in-vehicle information terminal (S209). The display of the in-vehicle information terminal may be a display in an instrument panel or a head-up display projected on a windshield. When the user parks the vehicle 20, S208 and S210 processes are executed from S203, and a message indicating that the parking position is to be changed is displayed on the easy-to-see display in the vehicle 20 on the spot. Accordingly, the user can recognize that the parking position needs to be changed in order to make the charging service easier to receive.

When the user moves the vehicle 20 according to the position change instruction of S209 and S210, the process of the flow chart of FIG. 6 may be repeated by returning to S203.

When it is determined in S207 that the vehicle 20 can be charged (S207: Yes), the determination device 10 determines a schedule of charging of the vehicle 20 together with the vehicle that reserves other charging, and dispatches the power supply vehicle 63 (S211).

As described above, according to the processing of the flowchart of FIG. 6, when the vehicle 20 of the user who has reserved the charging is parked, the determination device 10 can prompt the user to enter a state in which the charging service is easily received. Accordingly, it is possible to improve the accuracy of providing the charging service to the vehicle 20 by the power supply vehicle 63.

It should be noted that the present disclosure is not limited to the above-described embodiments, and many modifications and variations are possible. For example, the functions included in each means, each step, and the like may be rearranged so as not to logically contradict each other. It is possible to combine or divide a plurality of means or steps or the like into one.

What is claimed is:

1. A determination device comprising:
an acquisition unit that acquires sensor information output by a sensor that detects an obstacle around a vehicle to be charged; and
a control unit that specifies the obstacle that is located around the vehicle, based on the sensor information, and determines whether charging of the vehicle by a power supply vehicle is possible,
wherein when the obstacle located around the vehicle is specified, the control unit generates notifications of different contents and suitability of charging the vehicle based on a difference in distance from the obstacle to a charging port to which a charging cable is connected when the vehicle is charged.

2. The determination device according to claim 1, wherein the acquisition unit acquires the sensor information from a proximity sensor that is provided in the vehicle, that is disposed in a vicinity of a charging port to which a charging cable is connected when the vehicle is charged, and that detects the obstacle located facing the charging port.

3. The determination device according to claim 1, wherein the acquisition unit acquires, as the sensor information, information that enables determination of a length of the cable that is needed to connect from the power supply vehicle to the charging port.

4. The determination device according to claim 1, wherein:
the acquisition unit acquires the sensor information when the vehicle that has reserved the charging shifts to a parking state after traveling; and when determination is made that the charging of the vehicle by the power supply vehicle is not possible, the determination device transmits a notification to a user terminal associated with the vehicle.

\* \* \* \* \*